FIG. 5

| DECIMAL | S | BINARY | | | | S̄ | BINARY | | | | (Sn+1)(S̄n) | BINARY | | | |
|---|---|---|---|---|---|---|---|---|---|---|---|---|---|---|---|
| 0 | S0 | 0 | 0 | 0 | 0 | S̄0 | 1 | 1 | 1 | 1 | | | | | |
| 1 | S1 | 0 | 0 | 0 | (1) | S̄1 | 1 | 1 | 1 | 0 | (S1)(S̄0) | 0 | 0 | 0 | 1 |
| 2 | S2 | 0 | 0 | (1) | 0 | S̄2 | 1 | 1 | 0 | 1 | (S2)(S̄1) | 0 | 0 | 1 | 0 |
| 3 | S3 | 0 | 0 | 1 | (1) | S̄3 | 1 | 1 | 0 | 0 | (S3)(S̄2) | 0 | 0 | 0 | 1 |
| 4 | S4 | 0 | (1) | 0 | 0 | S̄4 | 1 | 0 | 1 | 1 | (S4)(S̄3) | 0 | 1 | 0 | 0 |
| 5 | S5 | 0 | 1 | 0 | (1) | S̄5 | 1 | 0 | 1 | 0 | (S5)(S̄4) | 0 | 0 | 0 | 1 |
| 6 | S6 | 0 | 1 | (1) | 0 | S̄6 | 1 | 0 | 0 | 1 | (S6)(S̄5) | 0 | 0 | 1 | 0 |
| 7 | S7 | 0 | 1 | 1 | (1) | S̄7 | 1 | 0 | 0 | 0 | (S7)(S̄6) | 0 | 0 | 0 | 1 |
| 8 | S8 | (1) | 0 | 0 | 0 | S̄8 | 0 | 1 | 1 | 1 | (S8)(S̄7) | 1 | 0 | 0 | 0 |
| 9 | S9 | 1 | 0 | 0 | (1) | S̄9 | 0 | 1 | 1 | 0 | (S9)(S̄8) | 0 | 0 | 0 | 1 |
| 10 | S10 | 1 | 0 | (1) | 0 | S̄10 | 0 | 1 | 0 | 1 | (S10)(S̄9) | 0 | 0 | 1 | 0 |
| 11 | S11 | 1 | 0 | 1 | (1) | S̄11 | 0 | 1 | 0 | 0 | (S11)(S̄10) | 0 | 0 | 0 | 1 |
| 12 | S12 | 1 | (1) | 0 | 0 | S̄12 | 0 | 0 | 1 | 1 | (S12)(S̄11) | 0 | 1 | 0 | 0 |
| | | | | | | | | | | | | | | | |
| | | | | | | | | | | | | | | | |
| | | | | | | | | | | | | | | | |
| n-1 | Sn-1 | | | | | S̄n-1 | | | | | (Sn-1)(S̄n-2) | | | | |
| n | Sn | | | | | S̄n | | | | | (Sn)(S̄n-1) | | | | |
| n+1 | Sn+1 | | | | | S̄n+1 | | | | | (Sn+1)(S̄n) | | | | |

United States Patent Office 3,343,137
Patented Sept. 19, 1967

3,343,137
PULSE DISTRIBUTION SYSTEM

Seiuemon Naba, Kanryo Shimizu, and Norito Yoshitake, Kawasaki, and Hisato Murakami, Sagamihara-shi, Japan, assignors to Fujitsu Limited, Kawasaki, Japan, a corporation of Japan Filed Aug. 20, 1964, Ser. No. 390,855
Claims priority, application Japan, Aug. 23, 1963, 38/44,774
6 Claims. (Cl. 340—172.5)

ABSTRACT OF THE DISCLOSURE

A first shift register has bits of information stored therein. An adder connected to the output of the first shift register adds +1 to the information stored in the first shift register. A second shift register has a number of bits of information to be distributed stored therein. An inhibit circuit connected to the outputs of the first shift register and the adder inverts the output of the first shift register. A first AND gate has a first input connected to the output of the first shift register and a second input connected to the output of the added. A second AND gate has a first input connected to the output of the second shift register and a second input connected to the output of the first AND gate. The distributed pulses provided by the pulse distribution system are in the output of the second AND gate.

The present invention relates to a pulse distribution system. More particularly, the invention relates to a pulse distribution system for producing synchronized pulses in a line.

Pulse distribution systems of the prior art utilize a large numberof gates. Furthermore, prior art pulse distribution systems utilize a number of binary counter stages determined by the number of bits. Transistor flip-flop or bistable multivibrator circuits are utilized as the binary counters, and such circuits are expensive. Another disadvantage of pulse distribution systems of the prior art is that if the number of bits to be calculated is less than the predetermined value of the most significant digit, there are many unnecessary binary counter stages. The unnecessary binary counter stages restrict the speed of calculation, because in the prior art systems the rotary switch feeding the pulses is connected in the input of the first binary counter stage.

The principal object of the present invention is to produce a new and improved pulse distribution system.

An object of the present invention is to provide a pulse distribution system of simplified structure.

Another object of the present invention is to provide a pulse distribution system having few components.

Another object of the present invention is to provide a pulse distribution system which is economical to manufacture.

Another object of the present invention is to provide a pulse distribution system utilizing a simple and flexible calculating circuit which calculates at high speed and within the time determined by the number of bits.

Still another object of the present invention is to provide a pulse distribution system which may utilize inexpensive components.

In accordance with the present invention, a pulse distribution system comprises a first shift register having bits of information stored therein. An adder connected to the output of the first shift register adds a signal of information to the information stored in the first shift register in a bit position having no signal in each cycle of operation of the first shift register. A second shift register has a predetermined number of bits of information stored therein. An inhibit circuit connected to the outputs of the first shift register and the adder inverts the output of the first shift register and provides an output which is the logical product of the output of the adder and the inverted output of the first shift register. An AND gate has a first input connected to the output of an inhibit circuit, a second input connected to the output of the second shift register and an output. Since the AND gate is made conductive by the simultaneous occurrence of signals in its first and second inputs, the predetermined number of bits of information in the second shift register are provided in the output of the AND gate as equally distributed pulses under the control of the inhibit circuit output.

In order that the present invention may be readily carried into effect, it will now be described with reference to the accompanying drawings, wherein:

FIG. 5 is a tabular presentation explaining the operation of the embodiment of FIG. 3.

Figure 1:
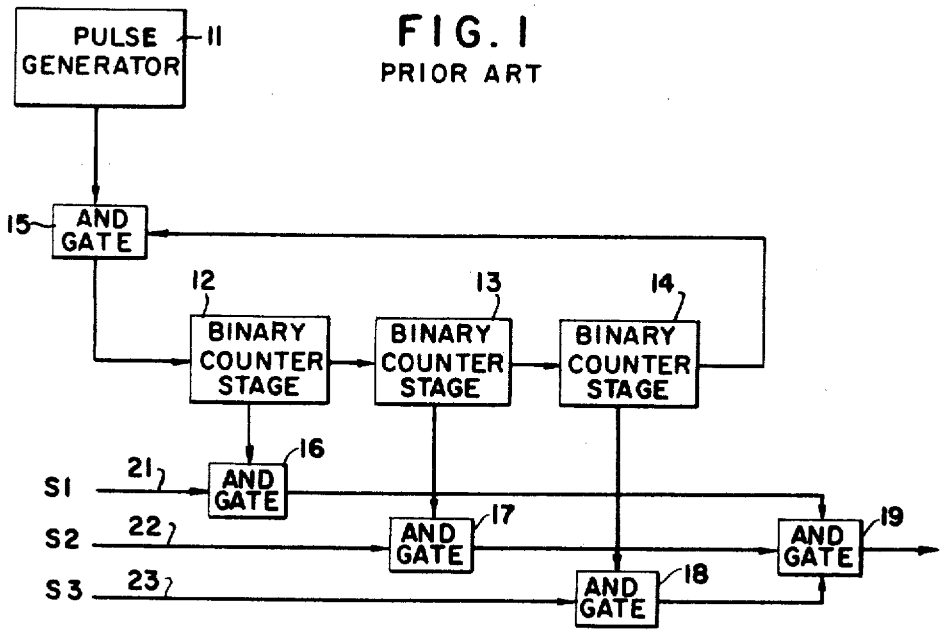
FIG. 1 PRIOR ART
FIG. 1 is a block diagram of an embodiment of a pulse distribution system of the prior art.

In the prior art pulse distribution system of FIG. 1, a conventional static calculation circuit is utilized. This is described in U.S. Patent No. 3,069,608.

In FIG. 1, a pulse generator 11 supplies pulses to binary counter stages 12, 13, 14, each of which comprises a bistable multivibrator or flip-flop of a type known in the art, via an AND gate 15. The embodiment of FIG. 1 is for a single dimension, such as, for example, *x* axis, control application, and therefore utilizes three binary counter stages 12, 13 and 14.

Each of the binary counter stages 12, 13 and 14 supplies a non-carry pulse to a corresponding AND gate 16, 17 and 18, respectively. A carry pulse is supplied to the next succeeding binary counter via an AND gate 19. An input binary information bit S1 is supplied to the AND gate 16 via input line 21. An input binary information bit S2 is supplied to the AND gate 17 via input line 22. An input binary information bit S3 is supplied to the AND gate 18 via input line 23.

Figure 2:
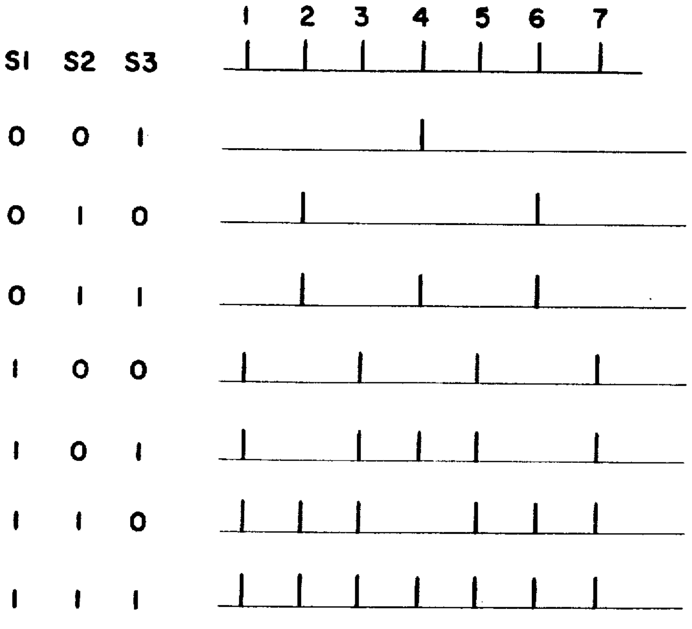
FIG. 2 PRIOR ART
FIG. 2 is a tabular presentation explaining the operation of the embodiment of FIG. 1.

The operation of the embodiment of FIG. 1 is illustrated by the tabular presentation of FIG. 2. Thus, one type of binary signal, such as, for example, a zero or negative signal S1 and S2 is supplied to lines 21 and 22, respectively, and the other type of binary signal, such as, for example, a 1 or positive signal S3 is supplied to the line 23. The AND gate 18 is then made conductive by the supplying of a pulse from the counter stage 14 simultaneously with the supplying of a pulse from the line 23. Thus, a single pulse out of seven is provided by the AND gate 19. The position of the single pulse is selected arbitrarily in the number 4 position to provide equal spacing around it. The single pulse is supplied by the counter stage 14.

The system of the prior art of FIG. 1 thus provides arbitrary numbers of equally spaced output pulses. If two pulses out of seven are desired to be provided, a signal S2 is supplied to the line 22 and no signals are supplied to the lines 21 and 23. The AND gate 17 is thus made conductive by the application of a pulse from the counter stage 13 simultaneously with the application of the signal or pulse S2, thereto and the AND gate 19 provides two equally spaced pulses. The positions of the two pulses are selected arbitrarily in the number 2 and number 6 positions to provide equal spacing. The two pulses are supplied by the counter stage 13.

If four pulses out of seven are desired to be provided, a signal S1 is supplied to the line 21 and no signals are supplied to the lines 22 and 23. The AND gate 16 is thus made conductive by the application of a pulse from the counter stage 12 simultaneously with the application of signal or pulse S1 thereto and the AND gate 19 provides four equally spaced pulses from the counter stage 12. The positions of the pulses are selected arbitrarily in the number 1, 3, 5 and 7 positions to provide equal spacing.

If five pulses out of seven are desired to be provided, signals S1 and S3 are supplied to the lines 21 and 23 and no signal is supplied to the line 22. The AND gates 16 and 18 are thus made conductive by the application of a pulse from the counter stage 12 simultaneously with the application of the signal or pulse S1 to the AND gate 16 and by the application of a pulse from the counter stage 14 simultaneously with the application of the signal or pulse S3 to the AND gate 18, and the AND gate 19 provides five equally spaced pulses from the counter stages 12 and 14. The positions of the five pulses are selected arbitrarily in the number 1, 3, 4, 5 and 7 positions to provide equal spacing.

The prior art system of FIG. 1 utilizes three AND gates 16, 17 and 18, each of the counter stages 12, 13 and 14 having a corresponding one of said gates connected to it. Thus, if the number of bits or of binary counter stages is increased, the number of AND gates is increased to the same number. If the system is to be utilized for a two dimensional, such as, for example, $x$ and $y$, control application, six binary counter stages and six corresponding AND gates are utilized in the embodiment of FIG. 1. If the system is to be utilized for a three dimensional, such as, for example, $x$, $y$ and $z$, control application, nine binary counter stages and nine corresponding AND gates are utilized in the embodiment of FIG. 1.

The pulse distribution system of the present invention utilizes a dynamic calculation circuit instead of the static calculation circuit utilized in systems of the prior art. The utilization of a dynamic calculation circuit permits the utilization of inexpensive circuit components, such as, for example, an electroacoustic delay line, which may not be utilized in a static calculation circuit. Furthermore, in the pulse distribution system of the present invention, the output pulse is derived with the aid of a DC signal.

Figure 3:
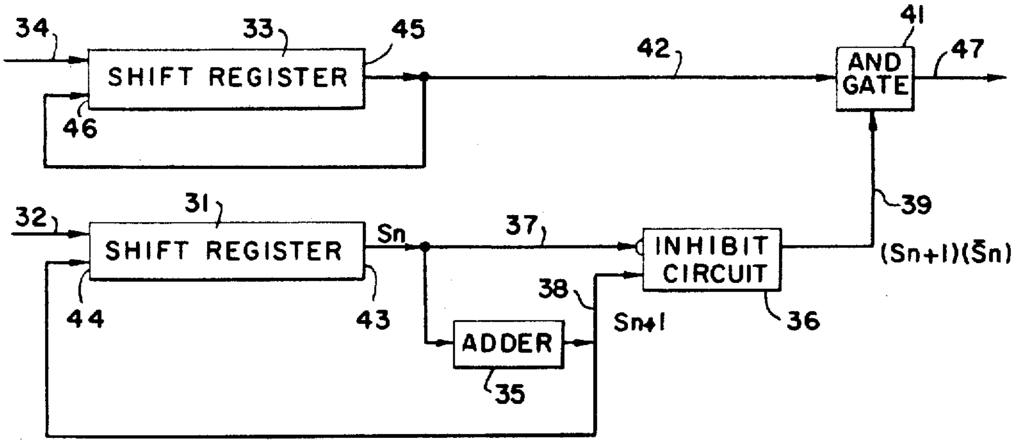
FIG. 3 is a block diagram of an embodiment of a portion of a pulse distribution system illustrating the principle of the present invention.

In the embodiment of FIG. 3, the bits of binary information are supplied to a first shift register 31 via input line 32 and the number of pulses to be distributed are supplied to a second shift register 33 via input line 34. Each of the first and second shift registers 31 and 33 is adapted to store the same number of bits and the pure binary numbers. The first shift register 31 includes an adder 35 which functions as a single unit or +1 adder in serial connection in the circuit of said shift register. The second shift register 33 stores the number of pulses to be distributed.

The output signal $Sn$ of the first shift register 31 is supplied to an inhibit circuit 36 directly via a line 37. The output signal $Sn$ of the first shift register 31 is also supplied to the inhibit circuit 36 via the adder 35 which functions to add +1 to said output signal so that the signal supplied to said inhibit circuit from said adder via a line 38 is $Sn+1$.

The inhibit circuit 36 may comprise any suitable inhibit circuit known, such as, for example, those shown and described on pages 199, 200, 201 of Computer Basics, volume 3, Digital Computers, Mathematics and Circuitry, by Technical Education and Management, Inc., Howard W. Sams & Co., Inc., The Bobbs-Merrill Company, Inc., 1962. The inhibit circuit 36 produces an output only if there is a signal in line 38 and no signal in line 37 at the same instant. The inhibit circuit 36 may be simplified to an AND gate with an inverter between the line 37 and the AND gate. An inverter circuit reverses any input signal, as described on page 74 of Computer Basics, volume 6, Solid State Computer Circuits, by Technical Education and Management, Inc., Howard W. Sams & Co., Inc., The Bobbs-Merrill Company, Inc., 1962, and pages 159 to 161 of Design and Operation of Digital Computers, by Dr. Gerhard Haas, Howard W. Sams & Co., Inc., The Bobbs-Merrill Company, Inc., 1963.

The output of the inhibit circuit 36 is the product of the signal $Sn+1$ in the line 38 and the inhibited output signal $\overline{S}n$ of the register 31 in the line 37. The output signal $(Sn+1)\ (\overline{S}n)$ of the inhibit circuit 36 is thus supplied via line 39 to an AND gate 41. The output signal from the second shift register 33 is supplied to the AND gate 41 via a line 42.

The shift register 31 and the shift register 33 may comprise any suitable shift register known, such as, for example, those shown and described on pages 72 to 77 of Design and Operation of Digital Computers, by Dr. Gerhard Haas, Howard W. Sams & Co., Inc., The Bobbs-Merrill Company, Inc., 1963. The adder 35 may comprise any suitable known adder circuit, such as, for example, those shown and described on pages 77 to 81 of the afore-described Hass textbook. The AND gate 41 may comprise any suitable known AND gate circuit, such as, for example, those shown and described on pages 177 to 184 of the afore-described Computer Basics, volume 3, textbook.

The least significant digit of the number stored in the first shift register 31 is stored at the right end 43 of said register and the most significant digit of said number is stored at the left end 44 of the said register. The most significant digit of the number stored in the second shift register 33 is stored at the right end 45 of said register and the least significant digit of said number is stored at the left end 46 of the said register. The least significant digit of a number stored in the register 31 and the most significant digit of a number stored in the register 33 are synchronized to enable them to be circulated through their respective registers.

The contents of the register 31 are increased by +1 due to the operation of the adder 35 for every cycle of operation of said register. The contents of the register 33, which register is synchronized with the register 31, are unchanged in each cycle of operation.

As hereinafter described, of the digits of the information represented by binary number stored in the first shift register 31, before changing at each cycle, only one digit changes from a zero, no signal, or negative condition to a signal, 1 or positive condition. If the output of the second shift register 33 is a signal, 1 or positive condition signal simultaneously with a similar signal from the inhibit circuit 36, the AND gate 41 is made conductive and conducts to the output 47 a number of pulses or signals from the register 33 for as long as there are similar signals or pulses in the lines 39 and 42.

During the time that the stored contents of the first shift register 31 vary from zero to a maximum number N a digit may change from zero or no signal to a signal or 1 N times. If a number $n$ is stored in the second shift register 33 for control or command purposes, there will be coincidence of the signals in the lines 39 and 42 only $n$ of the N times. This enables the same number $n$ of pulses to be conducted through the AND gate 41 to the output 47 as are desired and commanded or instructed by the second shift register 33.

Figure 4:
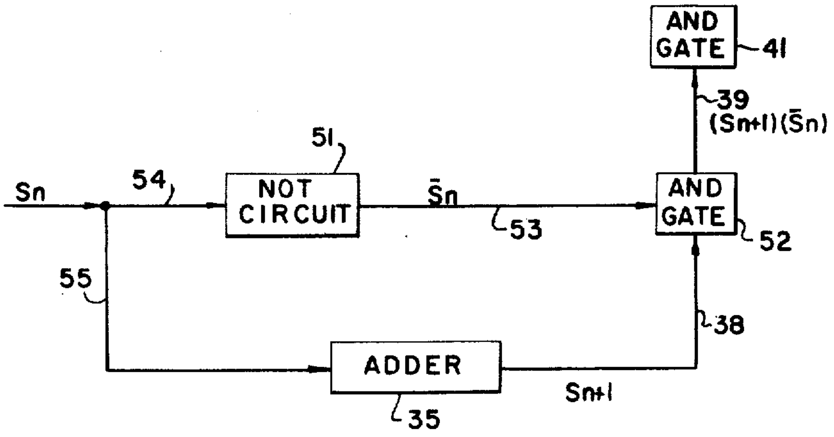
FIG. 4 is a block diagram of an embodiment of a portion of the embodiment of FIG. 3.

FIGS. 4 and 5 indicate when a digit of a number stored in the first shift register 31 changes from zero or no signal to a signal or 1 during a cycle of operation of said shift register. As hereinbefore mentioned, the inhibit circuit 36 of FIG. 3 may be considered the equivalent of a NOT circuit in one input to an AND gate. Thus, in FIG. 4, a NOT circuit 51 is connected to an AND gate 52 via a line 53. The added 35 is connected to the AND gate 52 via the line 38, as in FIG. 3.

In FIG. 4, the output signal of serial binary information Sn is shifted from the first shift register 31 to the NOT circuit 51 via a line 54 and to the adder 35 via a line 55. The NOT circuit 51 may comprise any suitable known NOT circuit, such as, for example, those shown and described on pages 173 to 176 of the afore-described Computer Basics, volume 3, textbook. The NOT circuit 1 functions in a manner wherein its input signal will not appear at its output.

The signal Sn is changed to Sn+1 by the adder 35 which supplies its output signal Sn+1 to the AND gate 52 via the line 38. The signal Sn supplied to the NOT circuit 51 via the line 54 is changed $\overline{S}n$ by said NOT circuit which supplies its output signal $\overline{S}n$ to the AND gate 52 via the line 53. $\overline{S}n$ is Sn inverted, as illustrated in FIG. 5. The signals Sn+1 in the line 38 and $\overline{S}n$ in the line 53 are provided simultaneously, so that the AND gate 52 is made conductive and provides at its output in the line 39 a signal (Sn+1) ($\overline{S}n$) which is the logical product of Sn+1 and $\overline{S}n$ and in which a digit changes from zero or no signal to a signal or 1 in each cycle, as indicated in the tabular presentation of FIG. 5. In FIG. 5, in the binary S column the digit which changes from zero or no signal to a 1 or signal in each cycle is encircled. The encircled 1 of each binary number of the binary S column of FIG. 5 is indicated electrically by a DC pulse having a duration equal to that of a clock period. A discussion of tetrad pulses in a binary serial arrangement and the function of the clock may be found on pages 54 and 55 of the aforementioned Haas textbook.

In the tabular presentaiton of FIG. 5, the first column on the left is the decimal column and indicates the number of pulses to be provided in equally spaced relation to each other. The second column from the left is the binary S column and indicates the signal output of the shift register 31 of FIG. 3 and the binary representation thereof. As indicated, a single bit changes from zero or no signal to a 1 or a signal in each cycle of operation. Since the binary positions are assumed as reading from right to left and having the values 1, 2, 4 and 8, reading from right to left, the number 1 is indicated in binary code as 0 0 0 1, the number 2 is indicated as 0 0 1 0, the number 3 is indicated as 0 0 1 1, the number 4 is indicated as 0 1 0 0, and so on.

The binary S column of FIG. 5 thus indicates that the binary representation of the numbers in changing from zero to 1 changes the bit in the one bit position in the right column from zero to 1 since the change is from 0 0 0 0 to 0 0 0 1. In changing from 1 to 2, the bit in the two bit position in the second column from the right changes from zero to 1 since the change is from 0 0 0 1 to 0 0 1 0. In changing from 2 to 3, the bit in the one bit position in the right column changes from zero to 1 since the change is from 0 0 1 0 to 0 0 1 1. In changing from 3 to 4, the bit in the 4 bit position in the third column from the right changes from zero to 1 since the change is from 0 0 1 1 to 0 1 0 0.

The binary $\overline{S}$ column is the third column from the left in FIG. 5 and indicates the signal output of the NOT circuit 51 of FIG. 4 and the binary representation thereof. $\overline{S}$ is the inverted binary representation of S so that, as indicated in FIG. 5, S0 is 0 0 0 0 and $\overline{S}0$ is 1 1 1 1, S1 is 0 0 0 1 and $\overline{S}1$ is 1 1 1 0, S2 is 0 0 1 0 and $\overline{S}2$ is 1 1 0 1, S3 is 0 0 1 1 and $\overline{S}3$ is 1 1 0 0, and so on.

The last column on the right in FIG. 5 is the binary logical product column and indicates the logical product of Sn+1 and $\overline{S}n$. The logical product of each set of signals provides a resultant binary representation, as indicated in FIG. 5, which is three zeroes or no signals and a single 1 or signal in the bit position of Sn+1 in which the zero changes to a signal or 1 from the preceding cycle. Thus, since in changing from S0 to S1 the zero in the one bit position changes to a 1, as indicated in the binary S column, the logical product of S1 and $\overline{S}0$ is 0 0 0 1, as indicated in the binary (Sn+1) ($\overline{S}n$) column. Since in changing from S1 to S2 the zero in the two bit position changes to a 1, as indicated in the binary S column, the logical product of S2 and $\overline{S}1$ is 0 0 1 0, as indicated in the binary (Sn+1) ($\overline{S}n$) column. Since in changing from S2 to S3 the zero in the one bit position changes to a 1, as indicated in the binary S column, the logical product of S3 and $\overline{S}2$ is 0 0 0 1, as indicated in the binary (Sn+1) ($\overline{S}n$) column. Since in changing from S3 to S4 the zero in the 4 bit position changes to a 1, as indicated in the binary S column, the logical product of S4 and $\overline{S}3$ is 0 1 0 0, as indicated in the binary (Sn+1) ($\overline{S}n$) column.

An output signal will be supplied to the output line 47 in FIG. 3 only when the signal (Sn+1) ($\overline{S}n$) is in the line 39 simultaneously with the output signal of the shift register 33. In the binary representation of (Sn+1) ($\overline{S}n$) a 1 or signal is evident in only one bit position, the other three bit positions having zero or being devoid of a signal, as indicated in FIG. 5. Each of the bits of the contents of the registers 31 and 33 are synchronized. Therefore, the most significant digit of the register 33 is supplied to the AND gate 41 via the line 42 at the same time instant that the 1 or signal of the signal (Sn+1) ($\overline{S}n$) is supplied to said AND gate via the line 39. At such time instant, therefore, the AND gate 41 receives a 1 or signal in each of its input lines 39 and 42 and is made conductive and provides an output pulse in the output line 47.

The contents of the register 31 and the register 33 are supplied from the least significant digit and the most significant digit, respectively, bit by bit, to the AND gate 41, and, as described, an output pulse is provided by said AND gate once for each cycle of operation of a register. The completion of a cycle of operation of the contents of both shift registers 31 and 33 utilizes all the informations stored and Sn is then completely converted to Sn+1. If the cycle of operation of the shift registers is then repeated, Sn+1 will change to Sn+2 and the pulse distribution operation will be repeated.

In the foregoing manner, *m* pulses will be produced in the output of the inhibit circuit 36 during *m* cycles of operation of the register 31. Of these *m* pulses, $2^n$ pulses will be provided by the register 31 via the least significant digit of *n* numbers stored therein. When the most significant digit of *n* numbers stored in the register 33 is a 1, $2^n$ pulses are provided in the output line 47 by the AND gate 41 as distributed pulses. That is, if the number of pulses to be distributed is stored in the register 33 in binary form, the number of pulses provided by the logical product of each digit of the register 33 which has a 1 in one of its bit positions and the digit provided as the output signal of the inhibit circuit 36 which has a 1 in the corresponding bit position, due to the shifting of the most significant digit of said register 33 in its cycle of operation, will agree with the desired number of pulses to be distributed; the desired number of pulses to be distributed being stored in the register 33.

Figure 6:
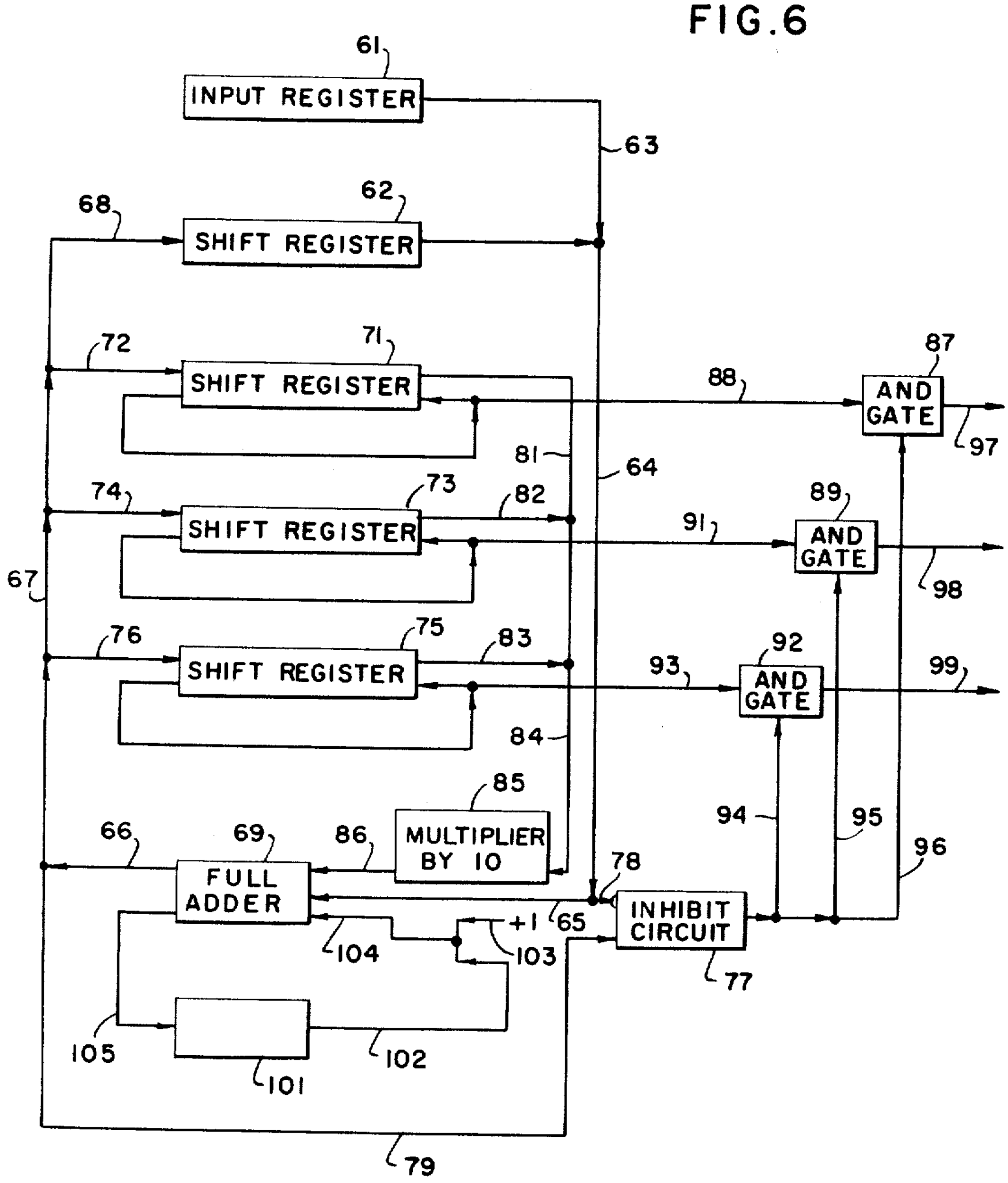
FIG. 6 is a block diagram of an embodiment of the pulse distribution system of the present invention.

FIG. 6 is a block diagram of an embodiment of the pulse distribution system of the present invention. The pulse distribution system of FIG. 6 is for pulse distribution in three dimensional control application. In each of the embodiments of FIGS. 3 and 6 it is assumed that the input information is supplied to the circuit in binary form. In each of these embodiments, binary coded decimal information may be converted to serial binary representation before it is supplied to the circuit.

In FIG. 6, an input register 61 comprises any suitable storage or register arrangement known in the art, such as, for example, that shown and described on pages 240 to 242 of the afore-described Haas textbook. The input register 61 supplies the bits of binary information to a first shift register 62 via lines 63, 64, 65, 66, 67 and 68 and a full adder 69 connected between the lines 65 and 66.

The input register 61 supplies the bits of information to a second shift register 71 via the lines 63, 64, 65, 66, 67 and 72 and the adder 69. The input register 61 supplies the bits of information to a third shift register 73 via the lines 63, 64, 65, 66, 67 and 74 and the adder 69. The input register 61 supplies the bits of information to a fourth shift register 75 via lines 63, 64, 65, 66, 67 and 76 and the adder 69.

The output of the first shift register 62 is supplied to an inhibit circuit 77 via the lines 64 and 78, to its own input via the lines 64, 65, adder 69, lines 66, 67 and 68, to the inputs of the second, third and fourth shift registers 71, 73 and 75 via the lines 64, 65, the adder 69, the lines 66 and 67 and the lines 72, 74 and 76, respectively, and to said inhibit circuit via the lines 64, 65, the adder 69, and the lines 66 and 79.

The least signficant digit output of each of the second, third and fourth shift registers 71, 73 and 75 is supplied via lines 81, 82 and 83, respectively, and line 84 to a tens multiplier 85. The tens multiplier 85 multiplies the signals supplied to it by ten and supplies them to the inputs of the first, second, third and fourth shift registers 62, 71, 73 and 75 via line 86, the full adder 69, the lines 66 and 67 and the lines 68, 72, 74 and 76, respectively, and to the inhibit circuit 77 via the line 79.

The tens multiplier 85 requires routing or shifting information by 1 bit in succession from the most significant digit of the input register 61 to each of the second, third and fourth shift registers 71, 73 and 75. Thus, the informations in each of the second, third and fourth shift registers 71, 73 and 75 are routed, together with new informations by 1 bit, in the same shift register after multiplication in the tens multiplier 85. The information is routed or shifted by 1 bit. Ordered informations are thus appropriately stored in each of the second, third and fourth shift registers 71, 73 and 75.

The shifted most significant digit of the second shift register 71 is supplied to a corresponding AND gate 87 via a line 88. The shifted most significant digit of the third shift register 73 is supplied to a corresponding AND gate 89 via a line 91. The shifted most significant digit of the fourth shift register 75 is supplied to a corresponding AND gate 92 via a line 93.

The output of the inhibit circuit 77 is supplied to the AND gate 92 via a line 94, to the AND gate 89 via a line 95 and to the AND gate 87 via a line 96. The distributed pulses are provided in output line 97 when the AND gate 87 is made conductive, in output line 98 when the AND gate 89 is made conductive and in output line 99 when the AND gate 92 is made conductive.

Each of the second, third and fourth shift registers 71, 73 and 75 stores the pulses to be distributed. During the calculating operation, the information in each of the registers 71, 73 and 75 is shifted from its most significant digit side, which is its left side, and is transferred to the corresponding one of the AND gates 87, 89 and 92, respectively. The information in the register 62 is converted into a new information in the inhibitor circuit 77 in the aforedescribed manner, and is supplied to the other input of each of the AND gates 87, 89 and 92 from the least significant digit side of said register, which is its right side. The direction of shifting of the first shift register 62 is thus opposite to the direction of shifting of each of the registers 71, 73 and 75.

The contents of the first shift register 62 are increased by one during every cycle of operation; that is, at every shift. When the contents of the register 62 reach a maximum value, a number of distributed pulses are provided in the outputs 97, 98 and 99 equal to the number stored in the second, third and fourth shift registers 71, 73 and 75.

The full adder 69 may comprise any suitable adder known in the art, such as, for example, one of those shown and described in the afore-described Haas textbook. The tens multiplier 85 may comprise any suitable tens multiplier known in the art. The shift registers and AND gates and inhibit circuit may be the same as those utilized in the embodiment of FIG. 3.

The embodiment of FIG. 6 provides a three dimensional pulse distribution system by combining three pulse distribution systems of the present invention in parallel arrangement. If an *e*-dimensional pulse distribution system is desired, this may be accomplished by combining *e* pulse distribution systems in parallel arrangement. Such a pulse distribution system will utilize a single first shift register 62 and *e* shift registers corresponding to the second, third, fourth, and so on, registers.

The pulse distribution system of the present invention may be utilized for many types of control systems, such as, for example, a numerical control system for a machine tool. If numerical control of a machine tool is to be achieved by continuous programming of a milling machine, lathe, and so on, it is important that the path and speed of the machine tool be determined. The degree of completeness of the pulse distribution is important for this purpose. Utilization of the pulse distribution system of the present invention permits realization of a numerical control system which distributes pulses with low loss and with great economy.

In the embodiment of FIG. 6 an electrohydraulic pulse motor may be connected to the outputs 97, 98 and 99 for utilization in a three dimensional control system for a machine tool. The input register 61 may comprise, for example, a magnetic tape or punched tape. The distribution speed may be determined by the input pulses on the tape.

While the invention has been described by means of specific examples and in specific embodiments, we do not wish to be limited thereto, for obvious modifications will occur to those skilled in the art without departing from the spirit and scope of the invention.

We claim:

1. A pulse distribution system comprising
   first shift register means having an output and having bits of information stored therein;
   adder means connected to the output of said first shift register means for adding +1 to the information stored in said first shift register means, said adder means having an output;
   second shift register means having an output and having a number of bits of information to be distributed stored therein;
   inhibit circuit means connected to the outputs of said first shift register and said adder means for inverting the output of said first shift register means;
   first AND gate means having an output, a first input connected to the output of said first shift register means and a second input connected to the output of said adder means; and
   second AND gate means having an output for providing pulses from said pulse distribution system, a first input connected to the output of said second shift register means and a second input connected to the output of said first AND gate means.

2. A pulse distribution system as claimed in claim 1, wherein said adder means adds +1 to the information stored in said first shift register means in a bit position having no signal in each cycle of operation of said first shift register means.

3. A pulse distribution system as claimed in claim 1, wherein said inhibit circuit means inverts the output of said first shift register means and provides the logical product of the output of said adder means and the inverted output of said first shift register means.

4. A pulse distribution system as claimed in claim 1, wherein said inhibit circuit means inverts the output of said first shift register means and provides the logical product of the output of said adder means and the inverted output of said first shift register means, the logical product of the output of said adder means comprising a binary representation of a number stored in said first shift register means with no signal in three of four bit positions and a signal in one of the four bit positions in which no signal occurred in the next preceding cycle of operation of said first shift register means, said adder means producing binary representations of a sequence of numbers increasing by one in each cycle of operation.

5. A pulse distribution system as claimed in claim 1, wherein said second AND gate means is made conductive to conduct bits of information from said second shift register means to the output of said second gate means upon the simultaneous occurrence of signals in the first and second inputs of said second AND gate means whereby said number of bits of information from said second shift register means are provided in the output of said second AND gate means as equally distributed pulses under the control of the output of said inhibit circuit means.

6. A pulse distribution system as claimed in claim 4, wherein said second AND gate means is made conductive to conduct bits of information from said second shift register means to the output of said second gate means upon the simultaneous occurrence of signals in the first and second inputs of said second AND gate means whereby said number of bits of information from said second shift register means are provided in the output of said second AND gate means as equally distributed pulses under the control of the output of said inhibit circuit means.

References Cited

UNITED STATES PATENTS

| | | | |
|---|---|---|---|
| 3,012,228 | 12/1961 | Kishi et al. | 340—172.6 |
| 3,015,806 | 1/1962 | Wang et al. | 340—147 |
| 3,046,545 | 7/1962 | Westerfield | 343—5 |
| 3,062,995 | 11/1962 | Raymond et al. | 318—162 |
| 3,135,947 | 6/1964 | Grondin et al. | 340—172.5 |
| 3,166,734 | 1/1965 | Helfrich | 340—147 |
| 3,209,332 | 9/1965 | Doersam | 340—172.5 |

ROBERT C. BAILEY, *Primary Examiner.*

R. RICKERT, *Assistant Examiner.*